J. B. WILSON.
Paper-Weights.
No. 133,912.            Patented Dec. 10, 1872.
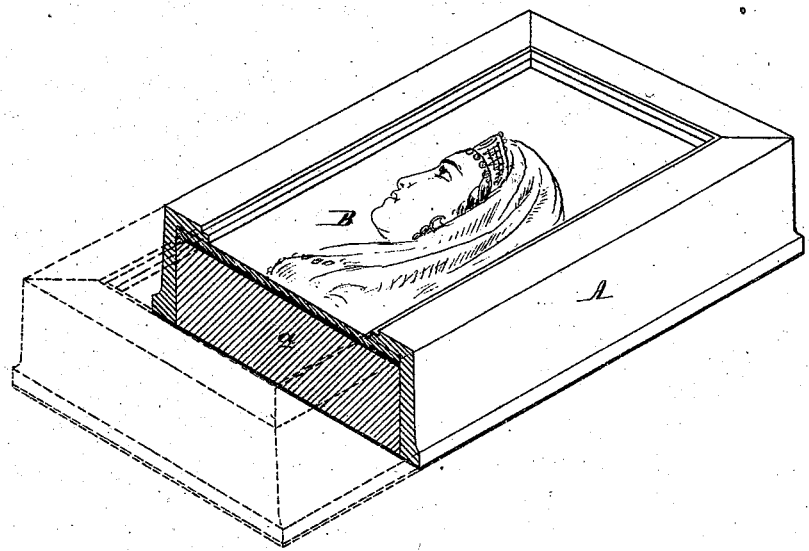
Witnesses: Harry Smith, Thomas McSloain
James Bernard Wilson
by his Atty.
Hewson and Don

UNITED STATES PATENT OFFICE.

JAMES B. WILSON, OF PHILADELPHIA, PENNSYLVANIA.

IMPROVEMENT IN PAPER-WEIGHTS.

Specification forming part of Letters Patent No. 133,912, dated December 10, 1872.

*To all whom it may concern:*

Be it known that I, JAMES BERNARD WILSON, of the city and county of Philadelphia, State of Pennsylvania, have invented an Improved Paper-Weight, of which the following is a specification:

The object of my invention is a paper-weight in which are comprised all the advantages of an ordinary weight as regards practical utility, and a neat and ornamental appearance not found in ordinary weights. This object I attain by the combination of a frame, A, of metal or other suitable material, illustrated in the accompanying drawing by a sectional perspective view, with a strip of glass ornamented by a picture or otherwise.

The frame A may be made of cast metal, ornamented by figures in relief, or by depressed designs. It may be ornamented by bronzing or enamelling, or other decorating process.

When the frame is made of metal, and is consequently comparatively heavy, the glass B may be thin, and may be retained in place by any suitable lips on the frame or by other fastenings, or it may be retained in place by a mass, $a$, of plaster of Paris, or other equivalent material or composition packed in the space beneath the glass.

When the frame is made of light material, *papier-maché*, for instance, or thin metal struck up to the desired shape, it may be re-enforced in weight to the desired extent by using a thick piece of ornamented glass, or by packing the space beneath the glass with a heavy substance or composition.

As regards the ornamentation of the glass, this may be accomplished in a variety of ways. A simple picture, for instance, may be placed beneath the glass; or the under side of the glass itself may be painted or otherwise ornamented.

I claim as my invention, and as a new article of manufacture—

A paper-weight, consisting of the frame A and glass plate B, fitted to the frame and ornamented, as set forth.

In testimony whereof I have signed my name to this specification in the presence of two subscribing witnesses.

JAS. BERNARD WILSON.

Witnesses:
WM. A. STEEL,
HARRY W. DOUTY.